(12) United States Patent
Koehler (10) Patent No.: US 7,605,515 B2
(45) Date of Patent: Oct. 20, 2009

(54) VARIABLE RELUCTANCE DYNAMO-ELECTRIC ROTARY MACHINE PROVIDED WITH UNITED MAGNETIC, ELECTRIC AND POLARISING CIRCUITS AND METHOD FOR PRODUCTION THEREOF

(76) Inventor: Gerard Koehler, 46, rue de Sevres, Ville-D'Avray (FR) F-92410

( * ) Notice: Subject to any disclaimer, the term of this patent is extended or adjusted under 35 U.S.C. 154(b) by 442 days.

(21) Appl. No.: 11/579,687

(22) PCT Filed: May 4, 2005

(86) PCT No.: PCT/FR2005/001117

§ 371 (c)(1),
(2), (4) Date: Nov. 6, 2006

(87) PCT Pub. No.: WO2005/122367

PCT Pub. Date: Dec. 22, 2005

(65) Prior Publication Data

US 2008/0258572 A1    Oct. 23, 2008

(30) Foreign Application Priority Data

May 6, 2004    (FR) .................................. 04 04870
May 26, 2004    (FR) .................................. 04 05677

(51) Int. Cl.
    *H02K 17/00* (2006.01)
(52) U.S. Cl. ...................... 310/207; 310/166; 310/168; 310/179
(58) Field of Classification Search .................. 310/166, 310/168, 171–172, 179, 184, 185, 207–208, 310/254, 261, 269, 258–259
See application file for complete search history.

(56) References Cited

U.S. PATENT DOCUMENTS

| 3,594,595 | A | * | 7/1971 | Williams et al. | ............. 310/168 |
| 4,450,396 | A | * | 5/1984 | Thornton | ..................... 318/721 |
| 4,604,541 | A | * | 8/1986 | Murasato et al. | ............. 310/180 |
| 4,654,552 | A |   | 3/1987 | Fritzsche | |
| 4,794,286 | A | * | 12/1988 | Taenzer | ....................... 310/12 |
| 5,111,095 | A | * | 5/1992 | Hendershot | ................. 310/168 |
| 5,138,244 | A | * | 8/1992 | Bahn | ........................... 318/701 |
| 5,274,287 | A | * | 12/1993 | Bahn | ........................ 310/68 B |
| 5,304,882 | A | * | 4/1994 | Lipo et al. | ............. 310/156.53 |
| 5,341,076 | A | * | 8/1994 | Bahn | ...................... 318/400.31 |

(Continued)

FOREIGN PATENT DOCUMENTS

EP    0 790 695    8/1997

(Continued)

*Primary Examiner*—Thanh Lam
(74) *Attorney, Agent, or Firm*—Young & Thompson (57) ABSTRACT

A monophase transverse circuit has two rows of cylindrical air gaps which are provided with conductors between terminal pairs, the terminal pairs are rotated at a quarter turn in order, a coil in the form of a flat double U-shaped arch remains global having consequent terminals by defining meanders between terminals which are laterally introducing opposite to a meander and whose sheets are now progressively attacked on one row of cylindrical or flat air gaps, thereby balancing axial forces, axial and opposite currents between adjacent slots convert a preceding ring-shaped flux into radial fluxes in the terminals by acting upon the rotor terminals with the same pitch and polarized by induction.

16 Claims, 7 Drawing Sheets

U.S. PATENT DOCUMENTS

| | | | |
|---|---|---|---|
| 5,652,493 A | 7/1997 | Hendershot, Jr. et al. | |
| 5,719,453 A * | 2/1998 | Horst | 310/68 R |
| 5,936,325 A | 8/1999 | Permuy et al. | |
| 6,348,751 B1 * | 2/2002 | Jermakian et al. | 310/207 |
| 6,781,273 B2 * | 8/2004 | Jinupun | 310/168 |
| 2006/0119206 A1 * | 6/2006 | Akemakou | 310/181 |

FOREIGN PATENT DOCUMENTS

| | | |
|---|---|---|
| EP | 0 942 517 | 9/1999 |
| EP | 1 063 754 | 12/2000 |
| EP | 1 170 850 | 1/2002 |
| FR | 2 742 937 | 6/1997 |
| FR | 2 802 728 | 6/2001 |
| FR | 2 862 166 | 5/2005 |
| WO | WO 91/12619 | 8/1991 |
| WO | WO 92/00628 | 1/1992 |
| WO | WO 94/18741 | 8/1994 |
| WO | WO 97/19508 | 5/1997 |
| WO | WO 99/48190 | 9/1999 |

* cited by examiner

VARIABLE RELUCTANCE DYNAMO-ELECTRIC ROTARY MACHINE PROVIDED WITH UNITED MAGNETIC, ELECTRIC AND POLARISING CIRCUITS AND METHOD FOR PRODUCTION THEREOF

Three dynamo-electric rotary motors with cylindrical air-gaps, an internal rotor, of 25 kW, the first being an asynchronous induction motor, the second being a variable reluctance motor and the third being a synchronous motor, are compared in a presentation having the title "Comparison of different drive system technologies for electric vehicles" by Dr. Udo WINTER of the SIEMENS company, having taken place between 1 and 3 Oct. 1998 and published in the EVS. BRUXELLES journal.

All these machines have their magnetic flux situated in planes perpendicular to the axis of rotation and are called parallel (to the direction of movement) flux. Their electric stator circuits are constituted by angularly distributed individual coils.

For each of these machines, the single-piece magnetic stator circuit is constituted by the assembly, by stacking in the axial direction, of sheets whose circular cut-out causes the stator poles to appear in a peripheral and radial manner. This arrangement simplifies the construction of the stator.

The air-gaps of this stator also have the advantage of having stator poles laminated by sheets of which the plane of one of the cross-sections is perpendicular to the local direction of movement, such that when an air-gap is closed, the sheets are all acted upon simultaneously and each one progressively. The result of this is that the saturation of a sheet takes place only at the end of the closing of the air-gap, which limits the iron losses and increases the speed of establishment of the flux, this being contrary to sheets which are perpendicular to the direction of movement.

The first and the third machines have a stator of vectorial composition whose drawbacks are listed in FR 2 862 166 (KOEHLER). The cost of the large volume of the permanent magnets of the third machine is prohibitive and the rotor polarisation cannot be adjusted. The first machine is economic as a motor but has a weak starting torque and lends itself to the energy recovery with difficulty.

With thought, it is possible to conceive a Tesla three phase vectorial composition in order to obtain three angularly distributed phases such as for the stator of the second variable reluctance machine, by adding a Vernier effect to ensure continuity of the movement.

Such a variable reluctance continuous air-gap with protruding poles intrinsically generates a higher torque than that of machines with smooth poles divided by slots, but in the second machine there are inter-phase leakages with a long flux path and the iron works only once per cycle because the rotor poles are not polarized.

The electric circuits of the three machines have a poor winding filling factor, especially in the vectorial composition. Conductors of large cross-section cannot be accepted, which leads to winding the conductors in parallel.

In order to overcome this last drawback, WO 91/12619 (MAGNET-MOTOR) proposes the use of copper flattening rings cut out and stacked on a pole with individual solderings between split rings in order to form a helix. This arrangement however necessitates one internal soldering per turn, and therefore individual, and this for dozens of coils.

With thought, it is also possible to offset the phases of a vectorial composition axially in order to have a variable reluctance machine with transverse flux and axially distributed phases, each in an elementary stator magnetic circuit with two rows of air-gaps such as in PCT WO 92/00628 (KOEHLER) which also has the advantage of having a global electric stator circuit per phase, but without rotor polarisation.

Figure 2:
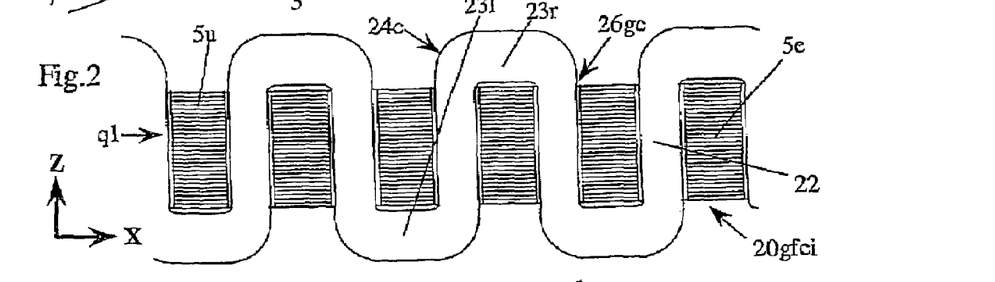
FIG. 2 is a view of this circuit from the air-gap with meanders according to the invention.

EP 0 942 517 (ABB DAIMLER-BENZ) and EP 1 063 754 (DAIMLERCHRISLER), with axially distributed phases, have rotor polarisation but with a composite stator the sheets of which are stacked in the direction of movement which makes these sheets, acted upon suddenly and all successively, give rise to high iron losses such as indicated in FIG. 2 of EP 1 063 754.

Moreover, although this last configuration makes it possible to have a one piece elementary magnetic circuit, it is however composite, constituted by a solid central ring able to receive two toothed rings made of sheets stacked in the axial direction. But with a central ring made of sintered magnetic material, the alternating flux generates higher iron losses in increased masses EP 0 790 695 (KOEHLER) with angularly distributed phases and the Vernier effect does not exhibit this latter defect, but the sheets are still acted upon suddenly.

A first purpose of the invention is to disclose a variable reluctance machine with polarized rotor poles, in which a magnetic stator circuit gives rise to few iron losses and is preferably constituted by a single part, that is to say global.

A second purpose is to constitute this magnetic stator circuit economically by a simple assembly or by stacking or by global winding of sheets or strips of sheets.

A third purpose is to have, for each phase, a global electric stator circuit constituted by a winding of a conductor. This conductor must be able to have a large cross-section as in the cited WO 91/12619 or be a cylindrical wire.

On the other hand, a rotor can be polarised in different ways:

Polarisation by the induction effect is described in EP 1 170 850 (KOEHLER) for a transverse flux machine with angularly distributed phases and in WO 99/48190 (ABB DAIMLER-BENZ) with axially distributed phases.

Global polarisation by a rotor winding is used in a Lindell machine, but in a not very effective way because only a part of the smooth surface of a stator pole of vectorial composition is covered by a protruding trapezoidal rotor pole.

Polarisation by individual permanent magnets is described in the cited EP 0 790 695 for a transverse flux machine with angularly distributed phases and in the cited EP 0 942 517 for a transverse flux machine with axially distributed phases.

Instead of having an individual polarization of each rotor pole by a permanent magnet, it is more advantageous to have a global polarization by permanent magnet or winding or by magnet and winding mixed, as recommended in the cited FR 2 862 166.

A fourth purpose of the invention is therefore that the machine according to the invention is able to receive a choice of devices for polarisation, preferably global, of the rotor poles depending on the use of the machine (starting torque, defluxing, risk of demagnetization, energy recovery, ambience, costs, etc).

A fifth purpose of the invention is to adapt the machine to the motorisation of a land transport means, ranging from the motorized-wheel bicycle described in FR 2 802 728 (TECHNICREA), but preferably without reduction gear.

In machines having a rotor framed by two stators with two rows of plane air-gaps, a disequilibrium between the air-gap distances of the planes increases the imbalance of the opposing axial forces as a function of the square of the flux ratios.

An electronic compensation has been proposed in WO 97/19508 (JEUMONT), but an irregularity or an accidental cut-off of one of the stators also causes a serious accident.

A sixth purpose of the invention is to overcome this defect simply because the structure with plane air-gaps can be advantageous, for example in order to occupy the centre of the machine.

On the other hand a modular structure such as that of FR 2 742 937 (JEUMONT) is advantageous from the point of view of construction, of reliability if the modules are independent and of performance: the elongation with constant diameter of a non-modular motor leads to an increase in the elongation of an air-gap with increased fringe fluxes and a deterioration of the winding factor $N^2/R$, which constitutes a seventh purpose of the invention.

However, axial modularity cannot be used if only a small fraction of the external diameter of the machine is available in axial length.

An eighth purpose of the invention is to propose a structure of the invention having an angular distribution of the phases of the machine, making it possible to have a short axial length.

Finally, the invention proposes choices for reducing the undulation rate and improving the efficiency at low load.

The invention therefore relates to a variable reluctance polyphase dynamo-electric rotary machine, comprising a rotor facing at least one stator, the rotor moving with respect to the stator by rotation of the direction Z axis, with a local direction of movement X, the stator comprising protruding stator poles, the rotor comprising protruding rotor poles at constant pitch, and this rotor comprising means of magnetic polarisation creating desired conditions of polarisation of the rotor poles in such a way as to have an alternating circulation of flux between stator poles facing rotor poles, through at least one row of cylindrical or plane air-gaps, the phases q of the machine being axially or angularly distributed forming elementary electric stator circuits housed in elementary magnetic stator circuits in order to constitute elementary stators.

According to the invention, an elementary stator is single phase and comprises, on a single row of air-gaps per elementary circuit, pairs of stator poles facing a same number of rotor poles of an elementary rotor circuit. The electric circuit produces a reversal of polarity N,S between the angularly adjacent stator poles belonging to a same phase q, that is to say in poles of different odd or even parity, the order of parity being determined starting from any angular origin.

Moreover, the stator poles are laminated by sheets in which the plane of one of the cross-sections is perpendicular to the local direction of movement X.

Finally, instead of having individual coils for each stator pole, the conductors of an elementary stator electric circuit of a phase q comprise meanders which alternately go around a stator pole on the one hand and then the adjacent pole on the other hand in order to form an elementary stator winding with consequent poles, able to be obtained by winding, preferably global.

In this way, the alternating flux loops are closed between of the pairs of stator and rotor poles, each pair being of the same parity and of different polarities between pairs when the air-gaps are being closed. This machine is therefore constituted by all of the elementary stators facing all of the elementary rotor circuits.

The air-gaps can be cylindrical with an internal or external stator or can be plane.

Finally, the polarisation of the rotor poles is carried out according to the envisaged use of the machine by reusing and adapting the different arrangements for the cylindrical air-gaps mentioned in the cited patents EP 1 170 850, FR 2 862 166 and WO 99/48190.

The phases q can be axially distributed: a single phase elementary electric stator circuit has a circular shape and is housed in a single phase elementary stator magnetic circuit which is also of circular shape and the elementary stators thus formed are arranged coaxially in order to constitute the stator of the machine.

The phases q can also be angularly distributed: a single phase elementary electric stator circuit has the shape of an angular sector. It comprises layers with meanders, the meanders of a layer being of opposite direction to the meanders of the adjacent layers. It is housed in at least one angular sector shaped single phase elementary magnetic stator circuit and the elementary stators thus formed are arranged to form a ring constituting the stator of the machine with cylindrical or plane air-gaps.

The stator poles can be produced from sheets obtained by punching out from a strip of magnetic material.

According to the disclosures of U.S. Pat. No. 4,654,552 (issued to GENERAL ELECTRIC), the strip can be curved in its plane about an axis which is perpendicular to the plane of the strip in order to obtain a stator with cylindrical air-gaps, in this case an external stator.

However, if this axis is situated on the opposite side to the stator poles, an internal stator is formed, obtained by helical-wound-up sheet, for example in order to obtain a motorized wheel.

A circuit with plane air-gaps can be obtained as described in the document 9805E of March 1998 by the English company BROOK HANSEN ELECTRODRIVES Ltd. West Midlands The strip, punched at constant pitch in order to cause the appearance of poles, is wound in its plane about its axis which is parallel with the plane of the said strip.

However, provision can be made for the slots between the poles to have a constant width with substantially radial edges to avoid increasing the length of the turns.

Moreover, holes can be cut out, each one between two stator poles in order that screws, passing though the holes can provide the axial positioning of the global elementary stator magnetic circuit with plane air-gaps thus constituted.

The poles of these circuits are therefore laminated by sheets of which the plane of one of the cross-sections is perpendicular to the direction X of movement.

In order to produce a machine with plane air-gaps, a first elementary stator magnetic circuit with plane air-gaps situated on one side, such as left, receives by axial translation a global elementary single phase stator electric circuit for plane air-gaps, forming a first left elementary stator.

Furthermore, a second elementary stator is arranged on the right side facing the first one, and between these two circuits is interposed a plane elementary rotor magnetic circuit, creating two plane rows of air-gaps.

This elementary rotor magnetic circuit achieves the putting in series and the polarisation of two pairs of air-gaps, one of them formed by adjacent poles of a first row of left air-gaps and the other by adjacent poles of the second row of right air-gaps, the polarities of the stator excitations being adapted to have a circulation of flux in series in these four air-gaps, in order to balance the axial forces.

Moreover, a connecting conductor achieves the putting in series of the global left and right elementary stator electric circuits in such a way as to balance the ampere-turns of the two elementary stators in the event of an incident. In this way an elementary fraction of a machine is formed with plane air-gaps with axially distributed phases.

In order to have a rotor polarisation, the rotor poles, such as the left ones and of even order, are joined by an external axial left rotor ring which is in contact with a first left lateral face of polarity such as N of a first global external torus shaped permanent magnet with axial magnetization, whose other face S is in contact with an external right axial rotor ring which joins the right rotor poles of even order.

Similarly, the left rotor poles of odd order are joined by an internal left axial ring which is in contact with a first lateral left face of polarity S of a second global internal permanent magnet with axial magnetization in the shape of a torus, whose other face N is in contact with an internal right rotor ring which joins the right axial rotor poles of odd order.

In order to regulate this polarisation, a global rotor winding can be arranged between the two permanent magnets and in this case, the permanent magnets can even be eliminated in order to increase the range of regulation, for example in the case of operating as a generator or in the case of operating at extreme temperatures.

With plane or cylindrical air-gaps, in order to have a motor function with an induction effect, a flux loop passing through two adjacent rotor poles comprises a short-circuited turn in its path.

On the other hand, each rotor pole of a row of air-gaps of parity such as odd can be in contact with a first polar face such as N of an individual permanent magnet and the rotor poles of opposite even parity of the same row of air-gaps have opposite parity S, either by contact with the other face of the permanent magnet, or by the intermediary of a pole piece joining one face of all the permanent magnets.

If the air-gaps are cylindrical, in order to have a concentration of flux, an individual permanent magnet has its polar faces in contact with the lateral faces of two adjacent independent rotor poles.

In order to reduce the volume of the magnets, a global permanent magnet with axial magnetization has a torus shape and is positioned between two rings that it polarises, the first ring on one side, such as left, of a polarity such as N joining rotor poles such as odd ones, and the second right ring, of polarity S, joining the even poles.

In this case, a global rotor winding of axis Z can be arranged against a non-polarised face of the permanent magnet.

If the operation of the machine is principally in motor mode and if a power supply supplies the stator electric circuits with square waveform currents, the number of the phases q1, q2 simultaneously excited can be advantageously varied in order to produce a variation of the duty cycle with constant ampere-turns.

Preferably, the cyclic ratio of stator teeth is greater than 1/2, the cyclic ratio of rotor teeth is greater than the cyclic ratio of stator teeth and, for a given number of phases q, these cyclic ratios are such that the duration of cut-off of a phase for working at nominal power is about the duration separating on the one hand the end of the constancy of reluctance of a closed air-gap and, on the other hand, the start of the closure of the next air-gap in order not to create opposing torques.

The number of phases q is preferably odd and greater than three in order to reduce the undulation rate.

According to another aspect of the invention, a method is proposed for manufacturing a variable reluctance polyphase dynamo-electric rotary machine, this machine comprising a rotor facing at least one stator, the rotor moving with respect to the stator by rotation of axis of direction Z, with a local direction of movement X, the stator comprising protruding stator poles, the rotor comprising protruding rotor poles at constant pitch, and this rotor comprising means of magnetic polarization creating conditions of polarization of the rotor poles in such a way as to have an alternating circulation of flux between stator poles facing rotor poles, through at least one row of air-gaps, the phases q of the machine being axially or angularly distributed forming elementary stator electric circuits housed in elementary stator magnetic circuits in order to constitute single phase elementary stators each comprising, on a single row of air-gaps, an even number of stator poles facing a same number of rotor poles of an elementary rotor circuit, the electric circuit producing a reversal of polarity between angularly adjacent stator poles belonging to a same phase q, meanders alternately going around a stator pole on the one hand then the adjacent pole on the other hand in order to produce a global elementary stator electric circuit with consequent poles.

This method comprises a stage of winding a thermo-adherent enamel coated wire in the torus shape under slight tension, as well as an operation of shaping and compacting of the meanders by thermo-adhesion in order to produce a global elementary stator electric circuit made of wire for cylindrical or plane air-gaps.

This method alternately comprises a stage of folding of insulated copper flattening (flat wire) substantially at a right angle on edge periodically, a first time in four folds forming a first crenellation U1 corresponding with the going around a stator pole internally and a second time two other bends formant with the first crenellation a second crenellation U2 and having a branch common with the first one, corresponding with going around the stator pole externally.

These foldings of inverted pairs of crenellations U1, U2 are followed over a first partial length of strip corresponding to a number of U's equal to the number of stator poles, and the ratio of the widths of the bottoms of U's of a pair is modified for the partial lengths of following strip until an inverse ratio is reached for the last partial length of strip forming in total a strip of folded flattening.

To form a singe phase global stator electric circuit in the form of successive U's for plane air-gaps, this method then comprises a bending of the strip in a direction perpendicular to the plane of the flattening, by acting on the corners of the folds.

This strip of flattening is then wound around an axis of direction Z and parallel to the axis of the folds of the U's.

For cylindrical air-gaps, this method then comprises folding of the flattening along axes which are not perpendicular to the edges of the flattening but which are inclined towards the axis of the machine such that the plane of the flattening is parallel with the lateral faces of the slot intended for it. The strip is then wound about an axis of direction Z.

In another embodiment, in order to constitute a global single phase elementary stator electric circuit in flattening for cylindrical air-gaps, this method comprises alternately a first stage of punching and of insulation in a strip of copper of a succession of flat elements in the form of a double L, joined to each other after a double inversion such that an element is constituted by the joined bases of the two L's and by two outer arms of the two L's, having opposite directions, followed by a second stage in which, successively, a terminal element of the strip is cut off, its ends are made level and the bases are arranged in a second slot of an elementary magnetic circuit, finally followed by a third stage in which the adjacent ends of the arms on each lateral face of the magnetic circuit are soldered together by dipping in a solder bath on each lateral face of the magnetic circuit in order to form a global single phase elementary stator electric circuit for cylindrical air-gaps.

The method according to any one of the preceding features can be used for the manufacture of a machine in which the air-gaps are cylindrical and in which a stator or a rotor comprises a magnetic circuit and an electric circuit, this method comprises moreover a stage of production of one of said circuits on the other in order to imbricate said circuits to constitute a stator or a rotor with rotor winding.

By way of example of imbrication, a magnetic circuit is divided into angular sectors each comprising a pole. A sector is limited angularly by two cuts one of which comprises a recessed angular mortise and the other of which comprises a protruding mortise. A radial mortise is arranged between the preceding mortises.

The assembly of these sectors on an electric circuit comprises the lateral introduction of the sectors of a first parity in a yoke, then the positioning of the electric circuit in the preceding assembly and finally the simultaneous axial introduction of the sectors of the other parity.

For an application to a motorized wheel of a vehicle, a machine with cylindrical air-gaps and an external stator comprises a fixed axis which is connected to the body of the vehicle by a connection comprising at least one degree of freedom. Bearings allow the rotation of a hollow shaft which bears the rotor and rings and brushes supplying the rotor winding.

A disk-shaped support, carrying conductors, is fitted on the end of the fixed shaft and carries the stator by the intermediary of a casing.

Finally a wheel, carrying a bearing member, is keyed onto the hollow shaft, between the motor and the body of the vehicle.

Other features of the invention will appear in the following description, given in a non-limiting manner.

In the appended drawings, given by way of example, relating to a variable reluctance multi-phase rotary dynamo-electric machine of axis Z.

With reference to the first document mentioned, the second motor is a rotary dynamo-electric machine 1 with parallel flux, cylindrical air-gaps, an internal rotor and variable reluctance which comprises a stator 2 and a rotor 3, the stator having an external magnetic stator circuit 4 constituted by an axial stack of sheets causing the appearance in radial directions of protruding laminated stator poles 5 each surrounded by a winding 6 and the rotor 3 having protruding poles 7 defining a single row of air-gaps 8.

The phases q1 q2 q3 are angularly distributed and a Vernier effect between stator and rotor poles assures the continuity of the movement.

This machine also comprises an axis of rotation 9 and a body 10 (non shown).

Figure 1:
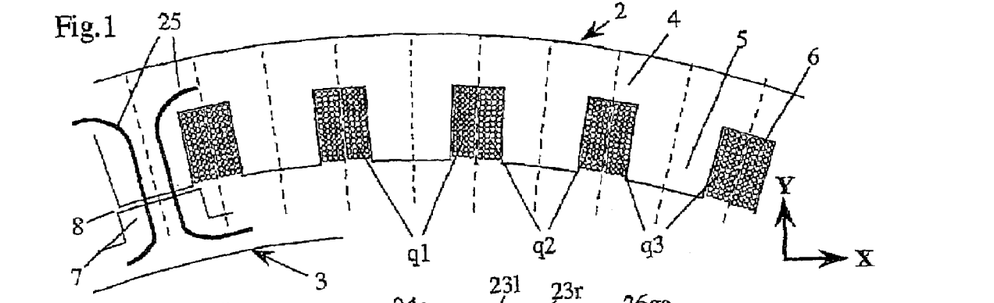
FIG. 1 shows a partial cross-section of a magnetic stator circuit with cylindrical air-gaps and stacked sheet such as described in the first document mentioned.

FIG. 1 shows a partial cross-section of such a magnetic stator circuit also constituted by the stacking and gluing in the axial direction of sheets allowing the appearance in the radial directions Y of the stator poles 5, 50 of them in this case, provided with windings 6. A rotor pole 7 of a rotor 3 (without winding) has also been shown.

In FIG. 2 according to the invention, pairs of stator poles 5 of a phase q are not provided with an individual coil which is difficult to implement. The phases q can also be angularly distributed as will be seen, but here they are axially distributed, each in an elementary magnetic stator circuit 20, which can have plane air-gaps p or cylindrical air-gaps c with in this case an internal i or external o stator, 20p, 20ci or 20co and which is here constituted globally g by stacking plane sheets f, that is to say 20gfci.

The rotor circuit 3 also breaks down into elementary magnetic rotor circuits 21 that are not shown in this figure which is seen from the air-gap with straightened curvature.

The number of rotor poles 7 is even and equal to the number of stator poles 5 of the phase q1. It is therefore possible to define even stator poles e such as 5e and odd poles u such as 5u, the parities being defined starting form any origin.

The winding 6 is constituted advantageously of conductors 22, making meanders 23, alternately going around a stator pole 5 such as an even one 5e on the right side r, say 23r then the adjacent pole 5u on the left side l, say 23l in order to produce here a single phase elementary electric circuit for cylindrical air-gaps c with consequent poles 24, say 24c.

This circuit can be made of wire or of flattening. This flattening can occupy the entire width of the slot as shown, or can occupy the height of the slot. This winding with consequent poles reduces the length of the conductors.

There is therefore an inversion of excitation between adjacent poles 5, which results in having, with the rotor poles 7, loops 25 of flux situated in planes parallel to the direction X of movement, as shown partially in FIG. 1.

The assembly of the magnetic circuit 20 with the electric circuit 24 constitutes a single phase elementary stator 26, in this case with cylindrical air-gaps, optionally global, g that is to say 26gc.

This parallel structure can result from the anamorphic transformation of a transverse single phase circuit comprising two cylindrical rows of air-gaps surrounding a global winding in form of a torus, the subject of the patents mentioned. The flux of this torus flows in an axial direction inside the torus and in the other direction outside of it. If the number of poles of a row of air-gaps is even, there is an even number of pairs of poles with the same angular setting.

The transformation, shown in FIG. 3, consists in rotating these pairs of poles 5el-5er and 5ul-5ur in a same direction by a quarter turn about a radial axis, assuming the conductors 22 to be extensible, such as shown in the following two states 3b and 3c.

In the last state 3d, the structure of the FIG. 2 is found again, the conductors having described meanders 23 of a winding that has remained global but with consequent poles 5e, 5u, in a circuit which has become parallel, global and with a single row of air-gaps with the stack of sheets in the direction X of movement. A winding such as 24gc made of flattening is described below.

In comparison with a coil of which all the turns surround a pole, the presence of opposed axial currents in adjacent slots converts the preceding annular flux into a radial flux, with however a slight loss of efficiency because of the absence of conductor between two meanders. This loss is however low since the length of a slot is in general a multiple of the width of a pole, whereas the efficiency of this winding is doubled in comparison with an individual coil which would occupy only half of the slot.

Figures 4, 5, 6:
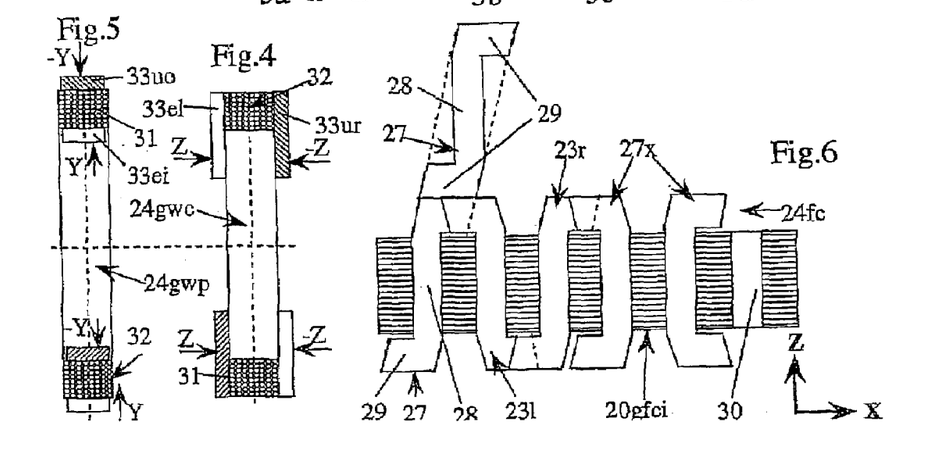
FIG. 4 shows a cylindrical shaping tool of a wired electric circuit.
FIG. 5 shows this tool for plane air-gaps.
FIG. 6 shows an electric circuit formed from double L shaped elements.

In a first structure of winding according to FIG. 4, for low powers, a thermo-adherent enamelled wire 31 is wound with low tension in the form of a torus 32 which is framed by two combs, one of them left l, that is to say 33el and the other one right r, that is to say 33ur of which the teeth correspond to the poles 5 of a same parity with an offset of one polar pitch between the combs. The two combs 33 are close to each other without crossing each other, in the axial direction Z-Z for cylindrical air-gaps c or, in FIG. 5 similar to the preceding one, in radial directions Y-Y for plane air-gaps p.

The diameter of the torus reduces to cause the appearance of the meanders 23. This electric circuit made of wire w for cylindrical c or plane p air-gaps, that is to say 24gwc or 24gwp, is usable after formation, for example by thermo-adhesion.

FIG. 6 shows another electric circuit structure 24, constituted by a first stage of cutting out from a strip of copper a succession of flat elements 27 in form of a double L attached to each other after a double inversion such that an element 27 is constituted by the attached bases 28 of the two L's and by two outer arms 29 of the two L's, having opposite directions. The strip thus formed is then insulated.

In a second stage, a terminal element 27 of the strip is cut, its ends are levelled and the bases 28 are placed in a slot 30 of a cylindrical elementary magnetic circuit such as 20gfci, these operations being carried out in order to cause the appearance of a series of meanders 23, that is to say 23r on the right side and 23l on the left side.

In a third stage, the adjacent ends of the arms 29 on each lateral face of the magnetic circuit 20, 21 are soldered together by immersion in a solder bath in order to constitute a single phase elementary stator or rotor electric circuit from flat strip for air-gaps that are cylindrical in this case, such as a circuit 24fc.

FIG. 6 also shows elements 27x. In such an element, the arms 27 have the same direction x, which means that the next layer in the slot 30 will have an opposite direction of winding.

With this arrangement, on a same pole 5 or 7, there will therefore be open-work meanders 23 on each lateral face, which facilitates the cooling of the winding heads.

Such an arrangement can be used in the case of an angular distribution of the phases.

Figures 7, 8, 9, 10, 11, 12, 13, 14, 15:
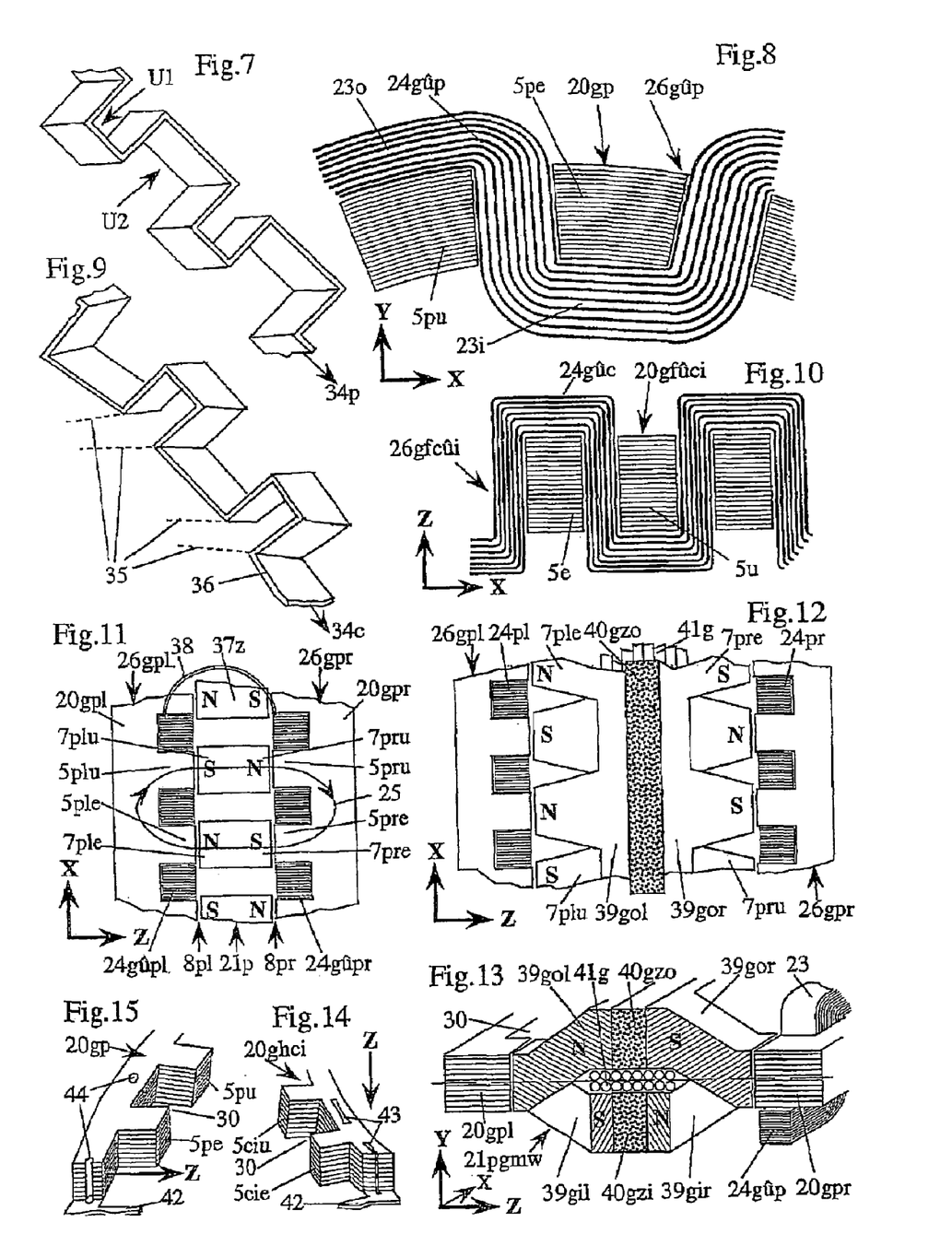
FIG. 7 is a perspective view of the folding of a flattening of an electric circuit for plane air-gaps.
FIG. 8 shows this electric circuit in a plane magnetic stator circuit.
FIG. 9 is similar to FIG. 7 but for cylindrical air-gaps.
FIG. 10 shows this circuit in a cylindrical magnetic stator circuit.
FIG. 11 diagrammatically shows FIG. 7 again with two stators framing a rotor having individual permanent magnets.
FIG. 12 shows FIG. 10 again but with a rotor having a global permanent magnet and global rotor winding.
FIG. 13 shows this machine in axial cross-section.
FIG. 14 is a perspective view of a stator originating from the winding of a magnetic strip about an axis perpendicular to the plane of the strip and on the side opposite to the poles.
FIG. 15 is similar to FIG. 13 but the axis is parallel with the plane of the strip.

FIG. 7 is a diagrammatic perspective representation of a third circuit structure 24 obtained by bending a flattening substantially at right angles.

This flattening is folded on its edge periodically, firstly in four folds forming a first crenellation U1 corresponding to going around a pole internally and a second time in two folds forming, with the first one, a second crenellation U2 and having a common branch with the first one, corresponding to going around the next pole externally.

These foldings of inverted pairs of crenellations U1,U2 are carried out on a first length of strip corresponding to a number U equal to the number of stator poles and the ratio of the widths of the bottoms of the U's of a pair is modified for the following strips until an inverse ratio is reached in order to terminate the folded length of strip 34p for plane air-gaps.

FIG. 8 shows several turns of this strip 34p bent about an axis of direction Z acting upon the folding angles in order to produce the meanders 23i and 23o of an elementary electric stator circuit 24 from flattening in successive U's for plane air-gaps p, that is to say 24gûp. The folds can be rounded in order to reduce the length of the conductors.

This circuit is axially slipped into a plane global elementary magnetic stator circuit, that is to say 20gp, having plane stator poles 5p of even e or odd u order, that is to say 5pe, 5pu separated by slots of constant width. In this way an elementary stator 26gûp with plane air-gaps and with axially distributed phases is formed.

FIG. 9 shows a folded strip 34c in the case of cylindrical air-gaps.

The flattening is therefore folded along axes 35 which are not perpendicular to the edges 36 of the flattening but which are inclines towards the axis of the machine in order that the plane of the flattening is parallel with the lateral faces of the slots 30 that are intended for them.

In FIG. 10 this electric circuit 24gûc is interleaved with an elementary magnetic stator circuit with cylindrical air-gaps 20gc with poles 5. The space between lateral conductors can be increased to facilitate cooling. This electric circuit can be wound on an internal stator constituted simply by stacking plane sheets f, that is to say 20gfûci constituting a single phase elementary stator 26gfcûi with axially distributed phases.

However, this winding would not be possible on a cylindrical magnetic circuit with an external stator 20co. In this case, it is the magnetic circuit which is wound or assembled on the electric circuit, as will be disclosed below.

In FIG. 11, the plane air-gap plan has been straightened and two stators, left 26gpl and right 26gpr surround, by rows of plane air-gaps plans 8pl, 8pr, a magnetic rotor circuit with plane air-gaps 21p, provided with plane rotor poles 7pl, 7pr of axial direction Z.

These rotor poles are here each constituted, in a simplified non-global manner, by a polar surface of an individual permanent magnet of axial direction 37z of which the polar surfaces N, S face stator poles 5pl and 5pr.

Two angularly adjacent poles 5p, that is to say 5pe, 5pu have opposite polarities. Therefore there are 5ple, 5plu, 7plu, 7pru, 5pru, 5pre, 7pre, 7ple and 5ple poles in series constituting a flux loop 25 with four air-gaps in series.

Moreover, the flux is the same in the left and right air-gaps, which avoids unbalanced axial forces in the case of slightly different air-gap distances, whereas with two independent loops 25, each with only two air-gaps in series, the opposing forces which are considerable depend on the square of the differences of air-gap distances Finally, the stator electric circuits of a phase 24gûpl and 24gûpr are placed in series by a linking conductor 38 in order to avoid an ampere-turn disequilibrium.

In an arrangement with axially distributed phases, the circuits of the other phases are arranged coaxially.

In FIG. 12, similar to FIG. 11 and in FIG. 13, a cross-sectional view, the rotor poles 7ple are joined by an external left rotor ring 39gol of axis Z which is in contact with a left lateral face such as N of a first external global permanent magnet with axial magnetization 40gzo of torus shape, of which the other face S is in contact with an external right ring o, 39gor, which joins the poles 7pre.

Similarly the poles 7plu are joined by an internal left ring 39gil in contact with the face S of a second global internal permanent magnet 40gzi of which the other face N is in contact with a right internal ring 39gir which joins the poles 7pru.

The origins of the even/odd parities of the left and right circuits can be not the same, taking account of the setting of the polarities of the circuits 26pl and 26pr.

Moreover, a rotor winding in torus form, and therefore global 41g is situated between the two permanent magnets 40gzo, 40gzi to be able to control the intensity of the polarisation.

The elementary magnetic rotor circuit is therefore bipolarised globally by permanent magnet m and wire w, that is to say 21pgmw.

FIG. 13 shows, partially in right hand perspective, conductors of an electric circuit made of strip bent into a U, that is to say 24gûp with a meander 23 and a slot 30 on the left.

FIG. 14 shows, in perspective, an elementary magnetic stator circuit with cylindrical air-gaps.

Considering the cited U.S. Pat. No. 4,654,552, a magnetic strip 42 is cut out causing the appearance of poles 5c between slots 30 and a winding by bending about an axis 9 (not shown, of direction Z) of which the direction Z is perpendicular to the plane of the strip 42. This bending in the plane of the strip is made possible because of the large number of poles and the fact of the presence of oblong openings 43. It therefore produces poles 5c for cylindrical air-gaps.

The helical winding deforms the oblong openings and is carried out until the poles 5c have the desired thickness.

If the axis 9 is on the side of the poles 5, one has a global elementary magnetic stator circuit with cylindrical air-gaps C with an external stator o and a helical winding h, that is to say 20ghco.

In this case, the helical winding of the magnetic circuit can therefore be done in the presence of an elementary global electric stator circuit 24g in wire, that is to say 24gwc or in flattening in û, that is to say 24gûc. The slightly conical poles 5c can therefore penetrate into the meanders 23 during this winding.

However, in FIG. 13, the axis 9 of direction Z is in this case on the opposite side to the poles 5c giving an elementary global magnetic stator circuit with cylindrical air-gaps c with an internal stator i, with a helical winding h, that is to say 20ghci usable in a motorized wheel.

FIG. 15 shows, in a similar way, an elementary global magnetic stator circuit with plane air-gaps 20gp. The magnetic strip 42 is wound around the axis 9 which is in this case parallel with the plane of the strip 42. The cutting out causes the appearance on one side of plane pole sheets 5p, each one between two slots 30.

The winding diameter is such that at the end of a turn, the foreseen number of plane poles 5p is obtained and the winding of the strip is continued until the poles 5p have the desired thickness. An elementary global magnetic stator circuit whose air-gaps are plane, that is to say 20gp, is thus constituted simply.

The flat poles 5p of this circuit are therefore laminated by sheets of which the plane of one of the cross-sections is perpendicular to the direction X of movement.

The slots 30 in this case have constant width and have substantially radial edges due to the adapted length of the arcs between the poles 5p as can be seen in FIG. 7.

Moreover, a hole 44 is cut out between two poles 5pe and 5pu. Self-tapping screws penetrate these holes 44 making it possible to have an accurate axial positioning.

Figure 16:
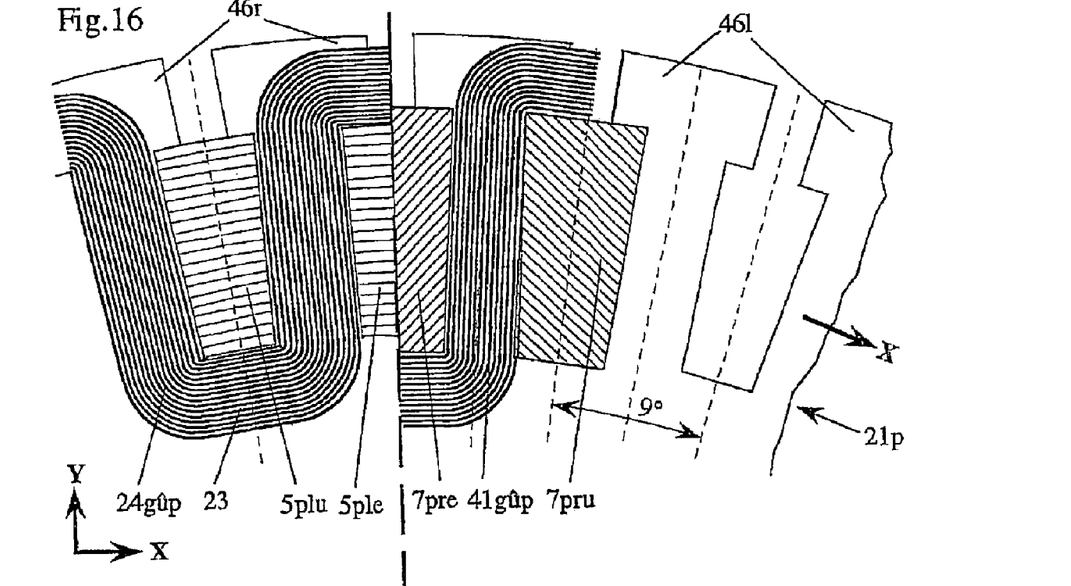
FIGS. 16 and 17 show details, in cross-section and in plan view, of a machine with axially distributed phases, plane air-gaps and a rotor which comprises a winding.
Figure 17:
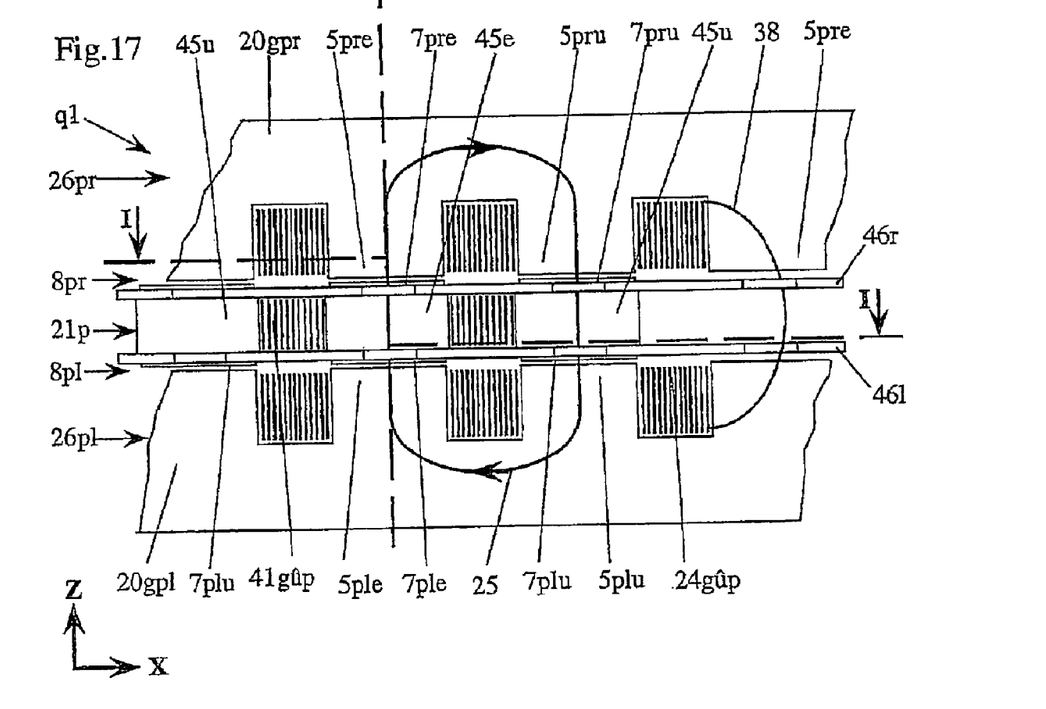

FIGS. 16 and 17 show an embodiment of a machine with plane air-gaps, axially distributed phases and rotor polarisation by winding in such away as to have an alternator function with voltage adjustable over a wide range, such as for a wind generator.

FIG. 16 is a cross-section perpendicular to the axis of rotation. A partial cross-section is shown, on the left hand side, at the level of a single phase magnetic stator circuit 26pr and on the right hand side on the level of the elementary magnetic rotor circuit 21p, towards the air-gap 8pl.

With reference to FIGS. 11 and 15, a magnetic stator circuit 20gp can be constituted by the winding of a strip causing the appearance of the plane poles 5pu and 5pe.

On the left can be seen these poles 5plu, 5ple of this circuit 20gpl surrounded by the meanders of a global electric stator circuit 24gûp of FIG. 8, the meanders of which have not been shown in FIG. 17 which is a view with straightened curvature.

On the right hand side of FIG. 16, the rotor circuit 21p comprises rotor poles 7pre, 7pru which are the right ends of independent cast bars 45.

The rotor polarisation is created by a global electric rotor circuit 41gûp, similar to the circuit 24gûp, which alternately goes around the bars 45e, 45u with its meanders. Only one pitch of this circuit has been shown.

The assembly 41, 45 is held between two plates 46r, 46l having on their peripheries partially closed slots in which the polar ends of the bars 45 are engaged, these bars having an increased central cross-section.

A phase q1 is constituted by a circuit 21p framed by two circuits 26pr and 26pi.

Figure 18:
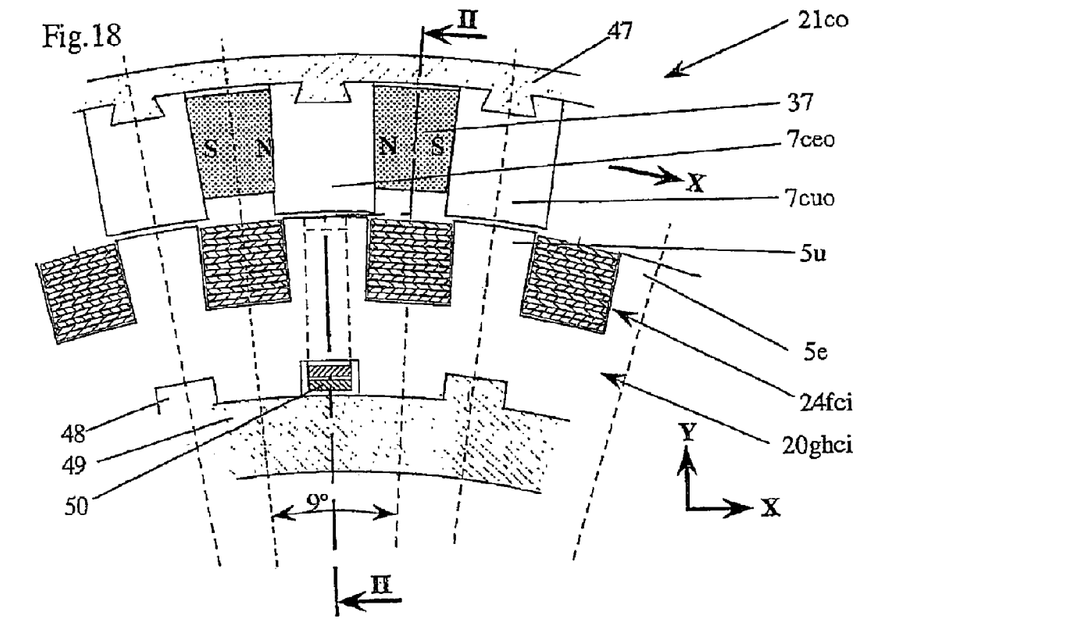
FIGS. 18 and 19 show the preceding two figures again but with cylindrical air-gaps, an external rotor and rotor polarisation by individual permanent magnets.
Figure 19:
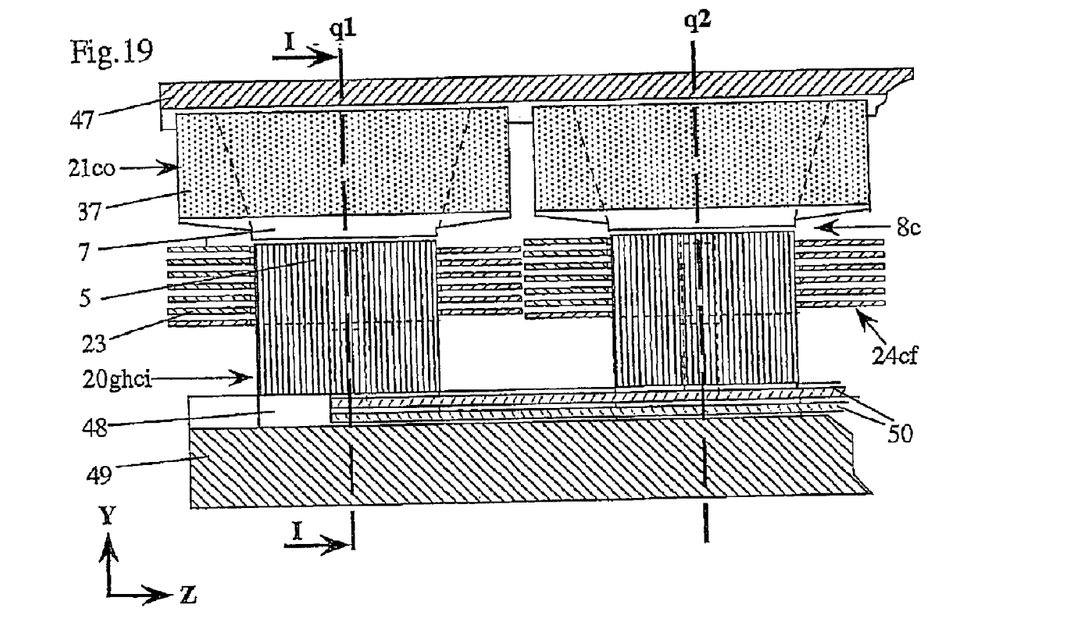

FIGS. 18 and 19 show a machine with cylindrical air-gaps and axially distributed phases and an internal stator, with polarisation by individual permanent magnets 37.

The elementary magnetic stator circuit is of the winding type 20ghci as in FIG. 14 and on this circuit an electric stator circuit 24fc as in FIG. 6 is produced, comprising flat elements 27. Circuits 27x can be arranged in at least one slot in order to have open-work meanders 23 on the winding heads, such as can be seen in FIG. 19. Air cooling is facilitated in this way but at least one pole 5 is lost.

An elementary external magnetic rotor circuit 21co is constituted by individual rotor poles 7c fixed in a rotary hoop 47. The individual permanent magnets 37 have their polar faces in contact in a slightly conical manner with the lateral faces of two poles 7ce, 7cu.

As can be seen in FIG. 19 which is to unit scale, a polar face has great length giving a flux concentration of 2×6.5×2/2× 3.5=3.7. With a relative air-gap of 0.7/15=0.047 and a plastic binder magnet of 0.63 T, the induction in the air-gap in the absence of excitation is theoretically 0.63×3.7/(1+0.047× 3.7)=2T.

Grooves 48 are formed in the central face of the magnetic circuit 20 to immobilize this circuit on a hub 49. However, power supply conductors 50 are arranged in one of these grooves which is free.

These conductors are connected on the one hand on meanders 23 at the ends of the electric circuit 24 and on the other hand to a radial end of the machine where they are connected in a detachable manner in order to be able to extract the vital components of the machine.

Moreover, the axial assembly of the various phases q1, q2, q3 . . . can be modular, which facilitates the maintenance of the machine.

Figure 20:
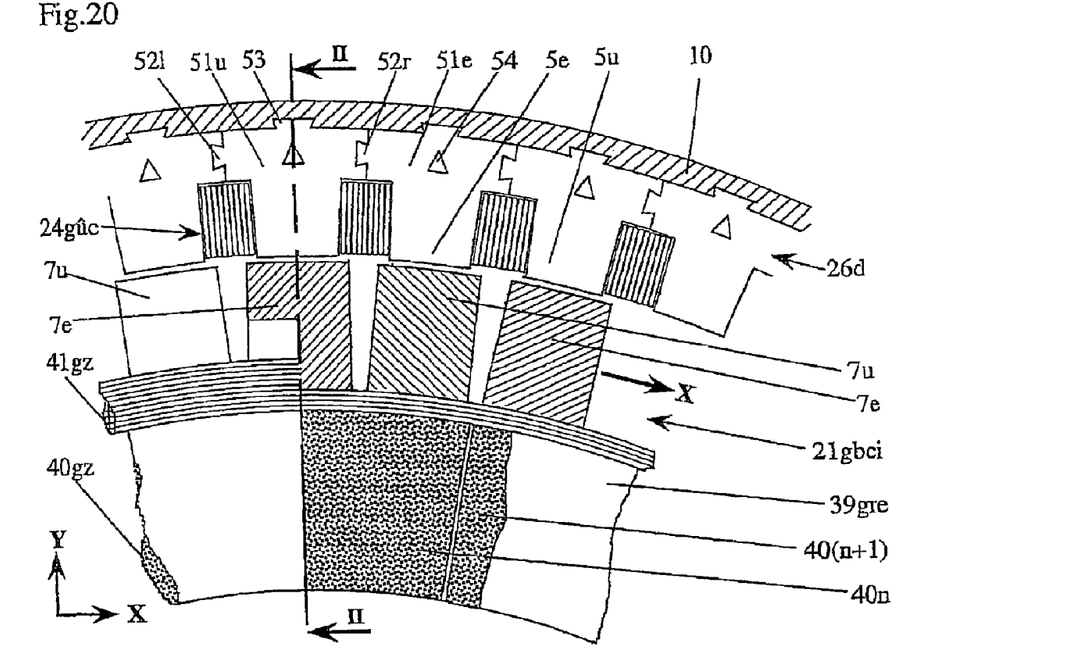
FIGS. 20 and 21 show the preceding two figures again, but with an internal rotor and rotor polarisation by global permanent magnet and global rotor winding.
Figure 21:
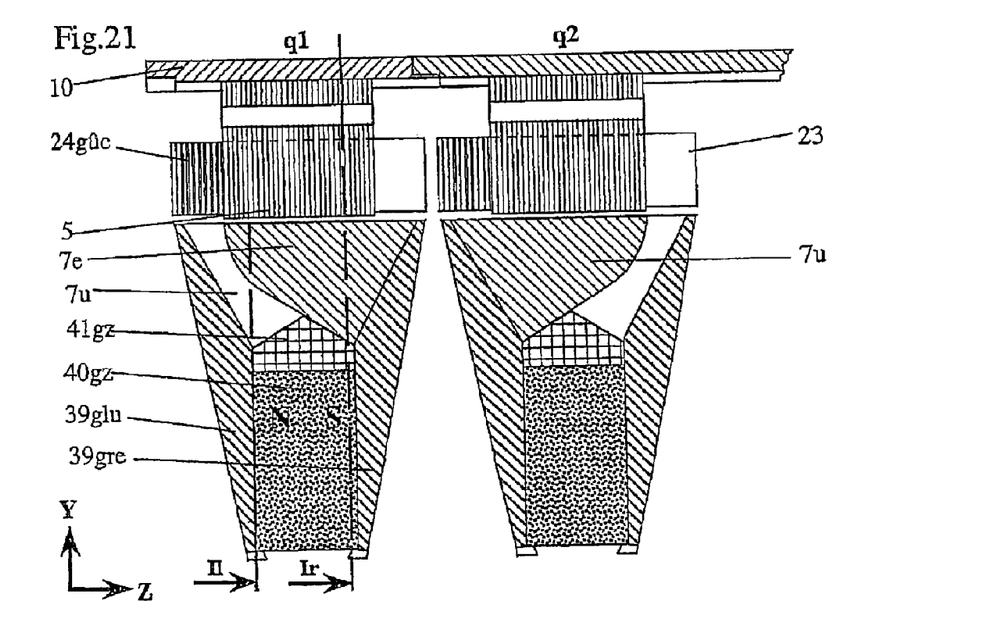

FIGS. 20 and 21 are similar to FIGS. 18 and 19 but for a machine with an external stator and with global rotor bipolarisation by permanent magnet and winding.

The elementary electric stator circuit 24 used in this case is a flattening which is folded, bent, helical wound-up and compacted as in FIGS. 9 and 10, that is to say 24gûc.

On this circuit a magnetic circuit is produced comprising angular magnetic sectors 51 having axial stacking of plane sheets comprising a pole 5, this sector being similar to the one shown in FIG. 5B1 of WO 2004/042893 (EMERSON ELECTRIC).

However, in this case a sector 51 is limited angularly by two cuttings, one of which, such as a right one, comprises a recessed trapezoidal mortise 52r and the other left one a protruding mortise 52l such that these mortises can interleave between adjacent sectors by assembly in the axial direction.

Each odd pole $5u$ is thus carried by a sector $51u$ and, similarly, $51e$ for the even poles $5e$ which can have oriented grains. The assembly is carried out as follows:

A radial mortise 53 allows the lateral introduction of the sectors, such as the even ones $51e$ in complementary slots of a face such as a right one r of a sector of body 10.

The electric circuit 24gûc is then placed in this assembly, the odd meanders $23u$ being situated between two adjacent even poles $5e$.

The odd sectors $51u$ are then all introduced simultaneously through the left face l.

The mortises 52, 53 can have a rake angle in order to facilitate the introduction of the sectors guided by a hole 54, to correctly centre the poles, to reduce the reluctances of the joints and to give rigidity to the stator which is thus constituted by axial displacement d, that is to say 26d.

Instead of insulating the slots 30, a pole 5 of a sector 51 is provided with a thin insulating belt before the lateral introduction of the sector.

The length of air-gap can be increased on the side opposite the lateral introduction.

The elementary cylindrical magnetic rotor circuit here comprises brushes b, that is to say 21bgci. It is seen on the left in cross-section 1l and on the right 1r as indicated in FIG. 21. This solid circuit comprises even poles $7e$ which are the offset claw-shaped ends of an axial even right rotor 39gre, the odd poles $7u$ being joined by a left odd ring 39glu.

These rings frame, on the one hand, the polar faces of an axial global permanent magnet 40gz and on the other hand a global rotor winding 41gz.

The global permanent magnet global 40 is preferably one with a plastic binder and breaks down into angular sectors such as $40n$, $40n+1$. Its lateral surface has no imposed limit towards the axis 9.

In FIG. 21, the rings are shown in cross-hatching that is heavier in comparison with that of the claws.

Figure 22:
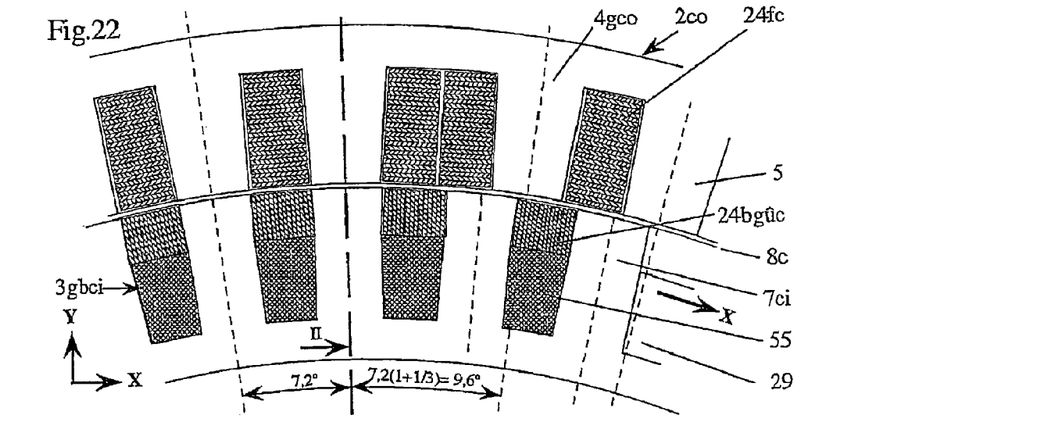
FIG. 22 shows in axial cross-section the junction of two sectors of a cylindrical stator having angularly distributed phases, with polarisation by winding and induction effect.
Figure 23:
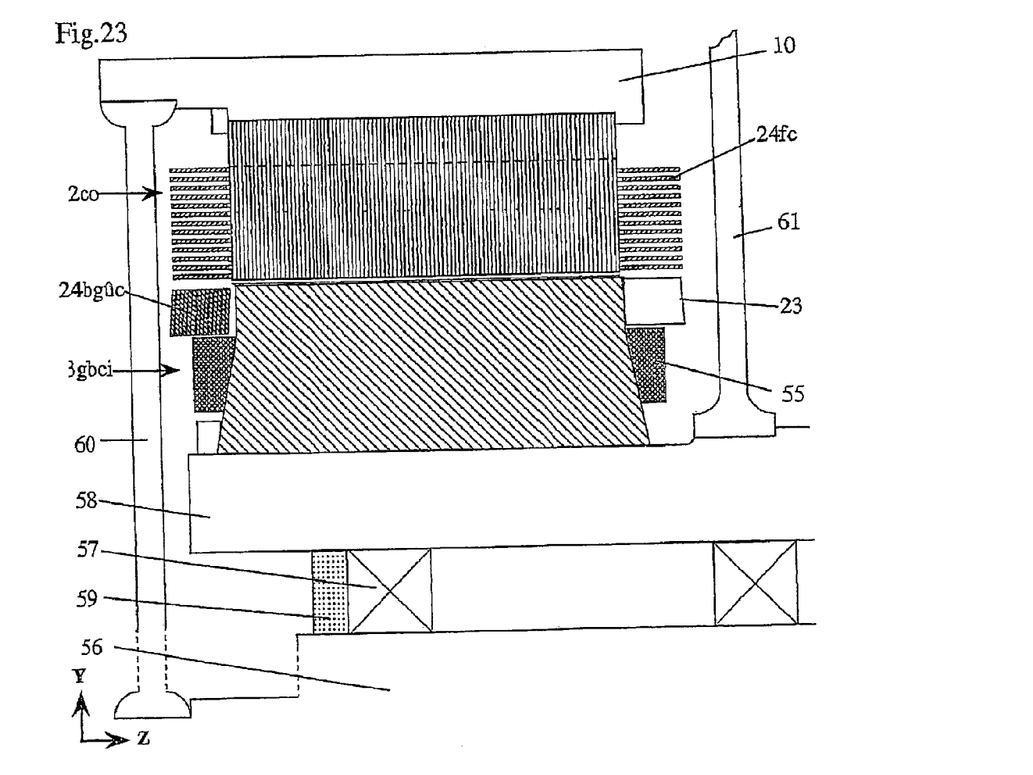
FIG. 23 is a cross-section through the axis of FIG. 21, with indications of configuration in the case of a motorized wheel.

FIGS. 22 and 23 show a cylindrical induction machine with cylindrical air-gaps and an external stator and also with an angular distribution of the phases.

In FIG. 22, shown in partial cross-section perpendicular to the axis, the external magnetic stator circuit is made of stacked sheets. It can be considered not as a single phase elementary stator but as a stator circuit 4gco giving a stator 2co when it is provided with multi-phase windings in the form of several single-phase sectors. In order to have axially balanced pairs, there are six electric circuits each surrounding eight poles 5 with an angular pitch of 7.2°.

In order to have a minimum phase shift between three-phase sectors, the pitch between two electric sectors in increased by one third of a pitch, which gives the rotor 6×8+ 6×⅓=50 poles 5 with a angle of 9.6 degrees between adjacent groups of phases.

Figure 3:
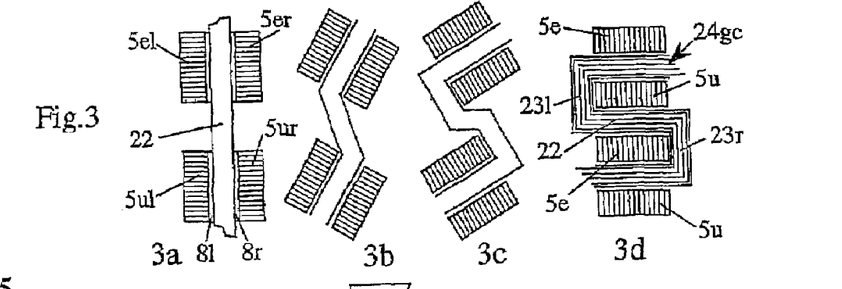
FIG. 3 illustrates a conversion of a known state in order to result in the invention.

The stator winding of each sector is done by an electric circuit 24fc according to FIG. 3 and it can be seen that the slot of the pitch increased by ⅓ can receive two stacks of insulated flat copper elements $27x$ whose arms 29 have a same direction. This offset causes the loss of four poles 5 but the winding heads are in open-work as seen in FIG. 22.

The magnetic rotor circuit 3 can be solid because the flux of a loop 25 which passes through them only has fluctuations without describing a complete hysteresis cycle.

This circuit here has 50 poles $7ci$, even $7cie$ and odd $7ciu$.

The bottom of the slots is occupied by a copper overmoulding 55 forming a squirrel cage procuring an induction effect with the stator winding 24fc.

Because the rotor flux is unidirectional with simple fluctuations, it is possible to add to the rotor a rotor winding with rings b and brushes such as 24bgûc wound directly in the shallow remainder of the slots 30 thus creating a wound rotor 3gb, in this case 3gbci.

The result of this is that the starting torque can be increased by a rotor excitation, correcting a defect of asynchronous motors.

Moreover, by reversing this excitation, a braking with energy recovery is caused.

It is also possible to have a generator function with better output and greater simplicity than by the method consisting in having sequences of uniquely inductive motor function, alternating rapidly with braking by stator dephasing, for example to fulfil an alternator-starter function.

In FIG. 23 there is also a diagrammatic representation of structural arrangements in the case of application to a motorized wheel for a vehicle, preferably for public urban transport.

A fixed shaft 56 is connected to the body of the vehicle by a connection with a shock absorber, giving a degree of vertical freedom and optionally of rotation for a steering wheel.

Bearings 57 allow the rotation of a hollow shaft 58 which supports the rotor 3bci such as for the shaft 9. Rings and brushes 59 supply the rotor winding 24bgûc.

A support in the form of a disk 60 is fitted onto the end of the fixed shaft 56 and carries the stator 2co via a body 10. This support comprises conductors supplying the stator and, optionally channels for a cooling liquid.

Furthermore a wheel 61 is keyed onto the hollow shaft 58, between the motor and the body of the vehicle. This wheel can carry a steel railway tyre or a rim for a pneumatic tyre, whose offset (not shown) is situated above the body 10. The result of this is that the carried load is borne directly on the fixed shaft 56 without having repercussion on the behaviour of the air-gap distances, contrary to the example of the cited FR 2 802 728.

A wheel with cooling vanes can also be interposed between the wheel 61 and the machine.

On withdrawing the support 60, there is direct access for maintenance.

As the motor has the shape of a thin ring, there is a space available between the shafts 56 and 58 for housing a mechanical brake.

It is no longer necessary to have an axle between two lateral wheels and by eliminating an axle, a low floor is available for access to the vehicle.

All of the wheels of the vehicle can be motorized and steering wheels, which reduces the predominance of each motor, improves adhesion, facilitates manoeuvres and increases overall efficiency.

With reference to the examples of embodiment, it can be seen that for a given application, six structures are available depending on the distribution of the phases, plane or cylindrical air-gaps and on an external or internal stator.

Figure 24:
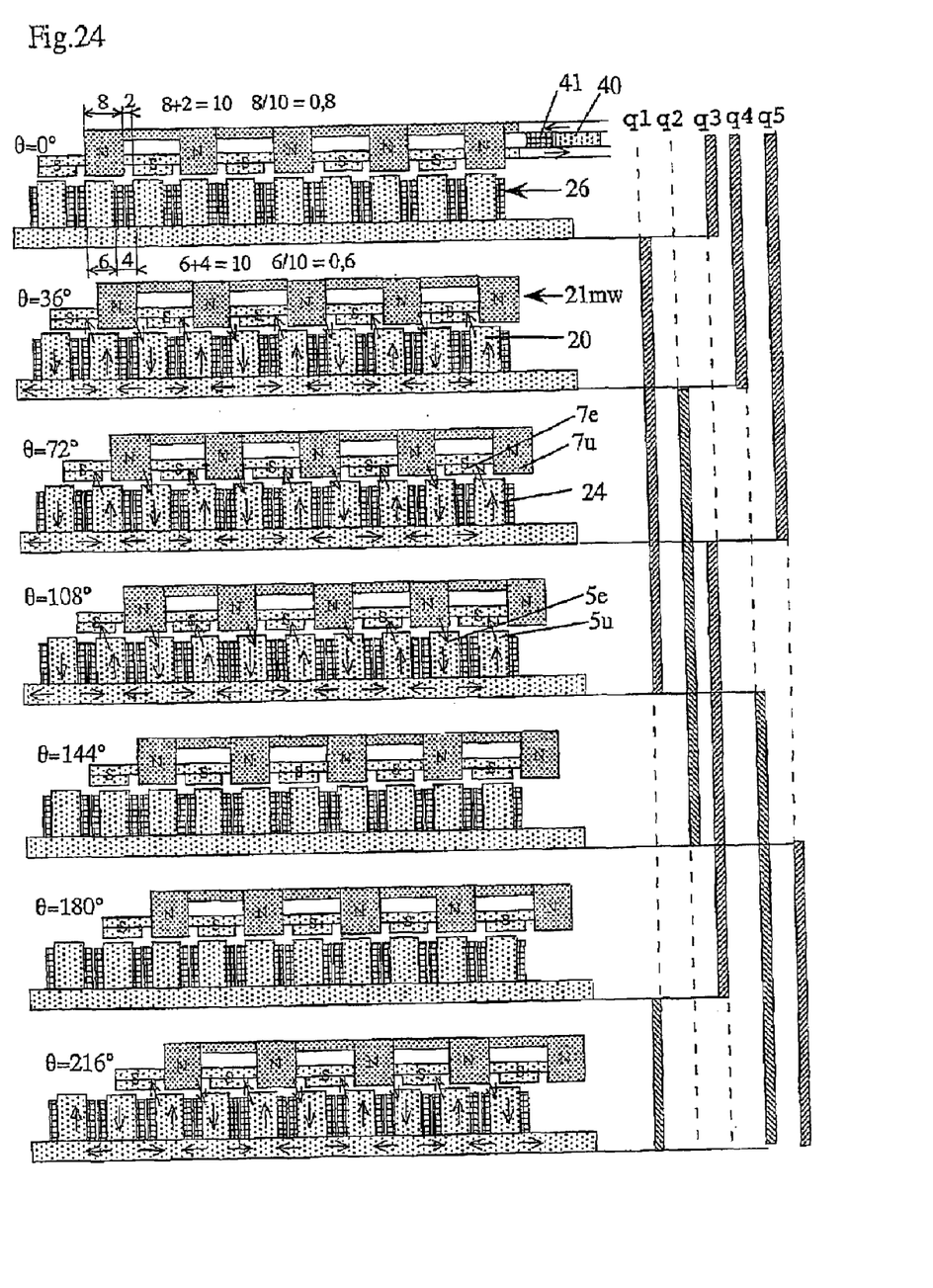
FIG. 24 is a diagram of the movement of a machine having five phases and double polarisation.

FIG. 24 is a displacement diagram of an elementary magnetic rotor circuit 21 having one phase and facing an elementary stator 26 of a five-phase machine, in the case of a bipolarisation mw and powered with square waveform currents.

Moreover, the case has been shown where three phases are powered simultaneously, the case of four simultaneous phases being used on start up.

It can be seen that by varying the number of phases simultaneously excited, the duty cycle is varied and therefore the power at constant ampere-turns. A loss of efficiency at weak excitations is thus avoided, which does not prevent having a variable excitation in the zone covering a same duty cycle.

Seven states have been shown from 0° to 216° in which a rotor 21 moves progressively towards the right, the stator excitation conforming with the diagram of phases shown on the right, from q1 to q5.

It can also be considered that five states from 0° to 144° represent the torques at a given time, reflecting the undulation rate.

The cyclic ratio of stator teeth is equal to 0.6 and that of the rotor to 0.8.

It can be seen that, during the openings of the air-gaps, there is no excitation, and therefore no opposing torque. Then, the arrival of a new excited stator pole picks up the rotor flux.

If the excitation were three-phase, an incident on one phase would put the machine out of service.

An even number of phases gives an undulation rate of the torque greater than that of the lower odd number. For these reasons, the invention proposes having an odd number of phases greater than three.

Without departing from the field of the invention, the invention is not of course limited to the examples described but it is possible to combine different described configurations, of geometry, of number of phases, of circuits, of form of air-gaps, of manufacturing and assembly methods, of polarisations, of magnetic materials, of conductors, of insulators, etc, whilst remaining within the claimed field.

As a method of manufacture, the formation of the meanders 23 on a torus 32 in enamelled wire 31 can also result from a deformation produced by pressure rollers acting progressively on an angular part of the previously covered torus 32.

A torus 32 can also be flattened in two superimposed sections, one of which will be conformed in meanders such as even ones and the other in odd meanders in order to constitute a sector of an angularly distributed phase for cylindrical air-gaps.

If the configuration of the machine so allows, several flat elements 27 can be obtained by a single cut-out, such as for example in an angularly distributed single phase sector with plane air-gaps plans.

By way of example of combination and assembly, the different stators or rotors of the machines with plane or cylindrical air-gaps can be swapped, as well as the axial or angular distributions of the phases. Thus, a wound rotor 3*b* can be constituted by an axial displacement of the poles such as for the elementary stator 26*d* of FIG. 20.

With regard to geometry, in order to avoid sudden variations of reluctance, it is possible to have a slight offset in the stacking of the sheets of a pole 5 or 7.

For a generator function such as that of a wind generator whose current will be rectified, the cyclic ratios of teeth can be 0.5 because there is no functioning as a motor.

For filling a deep slot 30 well, the lateral faces of which are not parallel because of a small number of pairs of poles with cylindrical air-gaps, the flat elements 27 of FIG. 6 have a width periodically modified as the filling of the slot progresses. Similarly, the strip 34*c* can have a decreasing thickness.

By way of example of insulation and shaping of electric circuit, a thermo-adhesion can be replaced by an impregnation under vacuum in the presence of the magnetic circuit.

In general, it can be stated that it is the meanders 23, involving protruding pairs of poles per single phase circuit, which make it possible to produce the advantageous arrangements described above.

The invention claimed is:

1. Variable reluctance polyphase dynamo-electric rotary machine (1), comprising a rotor (3) facing at least one stator (2), the rotor moving with respect to the stator (2) by rotation of the direction Z axis (9), with a local direction of movement X, the stator (2) comprising protruding stator poles (5), the rotor (3) comprising protruding rotor poles at constant pitch (7), and this rotor (3) comprising means of magnetic polarisation creating conditions of polarisation of the rotor poles in such a way as to have an alternating circulation of flux between stator poles (5) facing rotor poles (7), through at least one row (8) of air-gaps, the phases q of the machine being distributed forming elementary electric stator circuits (24) housed in elementary magnetic stator circuits (20) in order to constitute elementary stators (26), characterized in that an elementary stator (26) is single phase and comprises, on a single row (8) of air-gaps per elementary circuit, pairs of stator poles (5), facing a same number of rotor poles (7) of an elementary rotor circuit (21), in that the electric circuit (24) produces a reversal of polarity between angularly adjacent stator poles (5) belonging to a same phase q, in that the stator poles (5) are laminated by sheets in which the plane of one of the cross-sections is perpendicular to the local direction of movement X and in that the conductors of an elementary electric stator circuit (24) of a phase q comprise meanders (23) which alternately go around a stator pole (5) on the one hand and then the adjacent pole on the other hand in order to form a global elementary electric stator circuit with consequent poles (24*g*).

2. Machine according to claim 1, in which the phases q are axially distributed, characterized in that a single phase elementary electric stator circuit (24) has a circular shape and is housed in a single phase elementary magnetic stator circuit (20) of circular shape and in that the elementary stators (26) thus formed are arranged coaxially in order to constitute the stator (2) of the machine (1).

3. Machine according to claim 1, in which the phase q are angularly distributed, characterized in that a single phase elementary electric stator circuit (24) has the shape of an angular sector, comprises layers with opposing meanders between adjacent layers and is housed in at least one elementary magnetic stator circuit (20) in the shape of an angular sector (51) and in that the elementary stators (26) thus formed are arranged to form a ring constituting the stator (2) of the machine (1).

4. Machine according to claim 1, in which the stator poles (5) are produced from sheets obtained by punching a magnetic strip (42) which is bent in its plane about an axis (9), this axis being perpendicular to the plane of the strip (42), characterized in that the axis (9) is situated on the opposite side to the stator poles (5) in such a way as to constitute an internal stator obtained by helical-wound-up sheet (20*ghci*, 2*ghci*).

5. Machine according to claim 1 in which the stator poles (5) are produced from sheets obtained by punching a magnetic strip (42) which is wound in its plane about an axis (9), this axis being parallel with the plane of the strip (42), characterized in that slots (30) between the poles (5) have a constant width and have substantially radial edges and in that holes (44) are cut out, each one between two stator poles (5*p*) such that screws passing though the holes (44) can ensure the precise positioning of the elementary global magnetic stator circuit with plane air-gaps thus constituted (20*gp*).

6. Machine according to claim 1, characterized in that a first magnetic stator circuit with plane air-gaps situated on one side such as left (20*gpl*) receives by axial translation a single phase global electric stator circuit for plane air-gaps (24*gp*) producing a first left stator (26*gpl*), in that a second stator is arranged on the right side (26*gpr*) facing the first one, in that between these two circuits is interposed a plane magnetic rotor circuit (21*p*) creating two plane rows of air-gaps (8*pl*, 8*pr*), in that this plane magnetic rotor circuit (21*p*) achieves the putting in series and the polarisation of two pairs of air-gaps, one of them formed by adjacent poles of a first left row or air-gaps (8*pl*) and the other by adjacent poles of the second row of right air-gaps (8*pr*), the polarities of the stator excitations being adapted to have a circulation of flux in series in these four air-gaps, and in that a linking conductor (38) achieves the putting in series of the global left and right stator electric circuits (24*gpl*, 24*gpr*) in order to form a machine with plane air-gaps (1*gp*).

7. Machine according to claim 6, characterized in that the left rotor poles of even order (7*ple*) are joined by a left external axial rotor ring (39*gol*) which is in contact with a first left lateral face of a polarity such as N of a first global external permanent magnet with axial magnetisation (40*go*) in the shape of a torus, of which the other face S is in contact with a right external axial rotor ring (39*gor*) which joins the right rotor poles of even order (7*pre*) and in that the left rotor poles of odd order (7*plu*) are joined by a left internal axial rotor ring (39*gil*) which is in contact with a first left lateral face of a polarity S of a second global internal permanent magnet with axial magnetisation (40*gi*) in the shape of a torus, of which the other face N is in contact with a right internal axial rotor ring (39*gir*) which joins the right rotor poles of odd order (7*pru*).

8. Machine according to claim 7, characterized in that a global rotor winding (41*g*) is arranged between the two permanent magnets (40*go*, 40*gi*).

9. Machine according to claim 1, characterized in that a flux loop (25) passing through two adjacent rotor poles (7) comprises in its path a short-circuited turn (55) in order to create an induction effect.

10. Machine according to claim 1, characterized in that each rotor pole (7) of a same row of air-gaps (8) having a parity such as odd is in contact with a first polar face such as N of an individual permanent magnet (37) and in that each rotor pole (7) of opposite even parity of the same row of air-gaps has an opposite polarity S.

11. Machine according to claim 1, in which the air-gaps are cylindrical, characterized in that an individual permanent magnet (41) has its polar faces in contact with the lateral faces of two adjacent rotor poles (7*e*, 7*u*).

12. Machine according to claim 1, in which the air-gaps are cylindrical, characterized in that a global permanent magnet with axial magnetisation (40*gz*) has a torus shape and is positioned between two rings (39*g*) that it polarizes, the first ring on one side such as left (39*glu*) of polarity such as N joining rotor poles such as odd ones (7*u*) and the second right ring (39*gre*), of polarity S, joining the even poles (7*e*).

13. Machine according to claim 12, characterized in that a global rotor winding (41*g*) of axis Z is arranged against a non-polarized face of the permanent magnet (40*gz*).

14. Machine according to claim 1, in which the functioning is principally in motor mode and in which a power supply supplies square waveform currents to the electric stator circuits (24), characterized in that the number of phases (q1, q2 . . . ) simultaneously excited is varied in such a way as to produce a variation of the duty cycle with constant ampereturns.

15. Machine according to claim 14, characterized in that the cyclic ratio of stator teeth is greater than 1/2, in that the cyclic ratio of rotor teeth is greater than the cyclic ratio of stator teeth and in that, for a given number of phases q, these cyclic ratios are such that the duration of cut-off of a phase for working at nominal power is close to the duration separating on the one hand the end of constancy of reluctance of a closed air-gap and, on the other hand, the start of the closing of the next air-gap.

16. Machine according to claim 1, characterized in that the number of phases q is odd and greater than three.

* * * * *